(12) United States Patent
Ito et al.

(10) Patent No.: US 6,501,239 B2
(45) Date of Patent: Dec. 31, 2002

(54) AIR CONDITIONER FOR VEHICLE

(75) Inventors: Koji Ito, Nagoya (JP); Katsumi Nishikawa, Kariya (JP); Tokuhisa Takeuchi, Chita-gun (JP)

(73) Assignee: Denso Corporation, Kariya (JP)

( * ) Notice: Subject to any disclaimer, the term of this patent is extended or adjusted under 35 U.S.C. 154(b) by 0 days.

(21) Appl. No.: 09/961,535

(22) Filed: Sep. 20, 2001

(65) Prior Publication Data

US 2002/0036081 A1 Mar. 28, 2002

(30) Foreign Application Priority Data

Sep. 28, 2000 (JP) ........................................ 2000-296641

(51) Int. Cl.$^7$ ................................................ H02P 1/54
(52) U.S. Cl. ........................................................ 318/34
(58) Field of Search ................................... 323/201, 204, 323/234; 454/201, 204, 256, 258; 62/241, 243, 244; 318/34, 41, 49, 66, 68–70, 112, 113, 705, 715

(56) References Cited

U.S. PATENT DOCUMENTS

| 4,644,239 A | | 2/1987 | Yoshikawa et al. |
| 5,037,252 A | * | 8/1991 | Hasegawa et al. ............. 409/2 |
| 5,231,335 A | * | 7/1993 | Mega et al. ................... 318/85 |
| 6,383,071 B1 | * | 5/2002 | Takeuchi et al. ............. 454/121 |

* cited by examiner

*Primary Examiner*—Matthew Nguyen
(74) *Attorney, Agent, or Firm*—Harness, Dickey & Pierce, PLC

(57) ABSTRACT

A single position-detecting means for detecting rotation positions of electric motors is provided. Positions of a plurality of driven members are detected (estimated) based on the detection results. When a request of simultaneously operating the plurality of driven members is made, by sequentially operating the plurality of driven members one by one, the rotation positions of the plurality of electric motors can be detected by the single position-detecting means.

6 Claims, 6 Drawing Sheets

AIR CONDITIONER FOR VEHICLE

CROSS REFERENCE TO RELATED APPLICATION

This application is based on and incorporates herein by reference Japanese Patent Application No. 2000-296641 filed on Sep. 28, 2000.

BACKGROUND OF THE INVENTION

1. Field of the Invention:

The present invention relates to a driving apparatus having a plurality of driving means suitable for use in an air conditioner for a vehicle.

2. Description of Related Art:

A conventional driving apparatus drives a member is driven by an electric motor, and the position of the driven member is detected by a potentiometer (position detecting means).

For example, an air conditioner for a vehicle has an air inlet door for switching an air to be introduced between the inside air and the outside air, a temperature adjusting door for adjusting the temperature of blown air, a mode door for switching the direction of blowing air into a vehicle compartment, and the like. A driving apparatus of the air conditioner directly detects the position of each door (driven member) by a potentiometer provided for the door.

However, in the driving apparatus, to detect the positions of the driven members, potentiometers of the same number as that of the driven members are necessary. This is one of factors of the high cost of the driving apparatus.

SUMMARY OF THE INVENTION

An object of the present invention is to reduce the cost of a driving apparatus having a plurality of driven members, by enabling the positions of the driven members to be detected by a single position detecting means.

According to the present invention, there is provided a driving apparatus including electric motors, a plurality of driven members driven by the electric motors, a control means for controlling operation of the electric motors, and a position detecting means for detecting a rotation position of each of the electric motors. When a request of simultaneously operating the plurality of driven members is made, the control means controls the electric motors so as to sequentially operate the driven members one by one.

Thus, the rotation positions of the electric motors can be detected by the single position detecting means. The positions of the driven members are detected (estimated) based on the detection results, thereby eliminating potentiometers provided for the conventional driving members.

Here, when a plurality of driven members are simultaneously operated, the position of each of the driven members cannot be detected by the single position detecting means.

Thus, according to the present invention, when a request of simultaneously operating the plurality of driven members is made, by sequentially operating the driven members one by one, the positions of the plurality of driven members can be detected by the single position detecting means.

As described above, according to the present invention, potentiometers of the same number as that of the driven members can be eliminated. Moreover, the single position detecting means is provided in place of the potentiometers, so that the cost of the driving apparatus can be reduced.

According to another aspect of the present invention, there is provided an air conditioner for a vehicle, including an air conditioning casing for forming an air path, an evaporator disposed in the air path for cooling air, a heater core disposed in the air path for heating the air, an inside air/outside air switching driven member for switching air to be introduced into the air path between an inside air and an outside air, a temperature adjusting driven member for adjusting temperature of the air, an air-blowing mode switching driven member for switching a direction of blowing the air into a vehicle compartment, electric motors for driving the three driven members, control means for controlling operation of each of the electric motors, and a position detecting means for detecting rotation position of each of the electric motors. When a request of simultaneously operating at least two driven members out of the three driven members is received, the control means controls the electric motors so as to sequentially operate the driven members requested to operate one by one.

Thus, according to the air conditioner, in a manner similar to the driving apparatus, no potentiometer is required. Moreover, only one position detecting means is required in place of the potentiometers. Thus, the cost of the driving apparatus in the air conditioner for a vehicle is reduced.

BRIEF DESCRIPTION OF THE DRAWINGS

Additional objects and advantages of the present invention will be more readily apparent from the following detailed description of preferred embodiments thereof when taken together with the accompanying drawings in which.

DETAILED DESCRIPTION OF PREFERRED EMBODIMENTS (First Embodiment)

Figure 1:
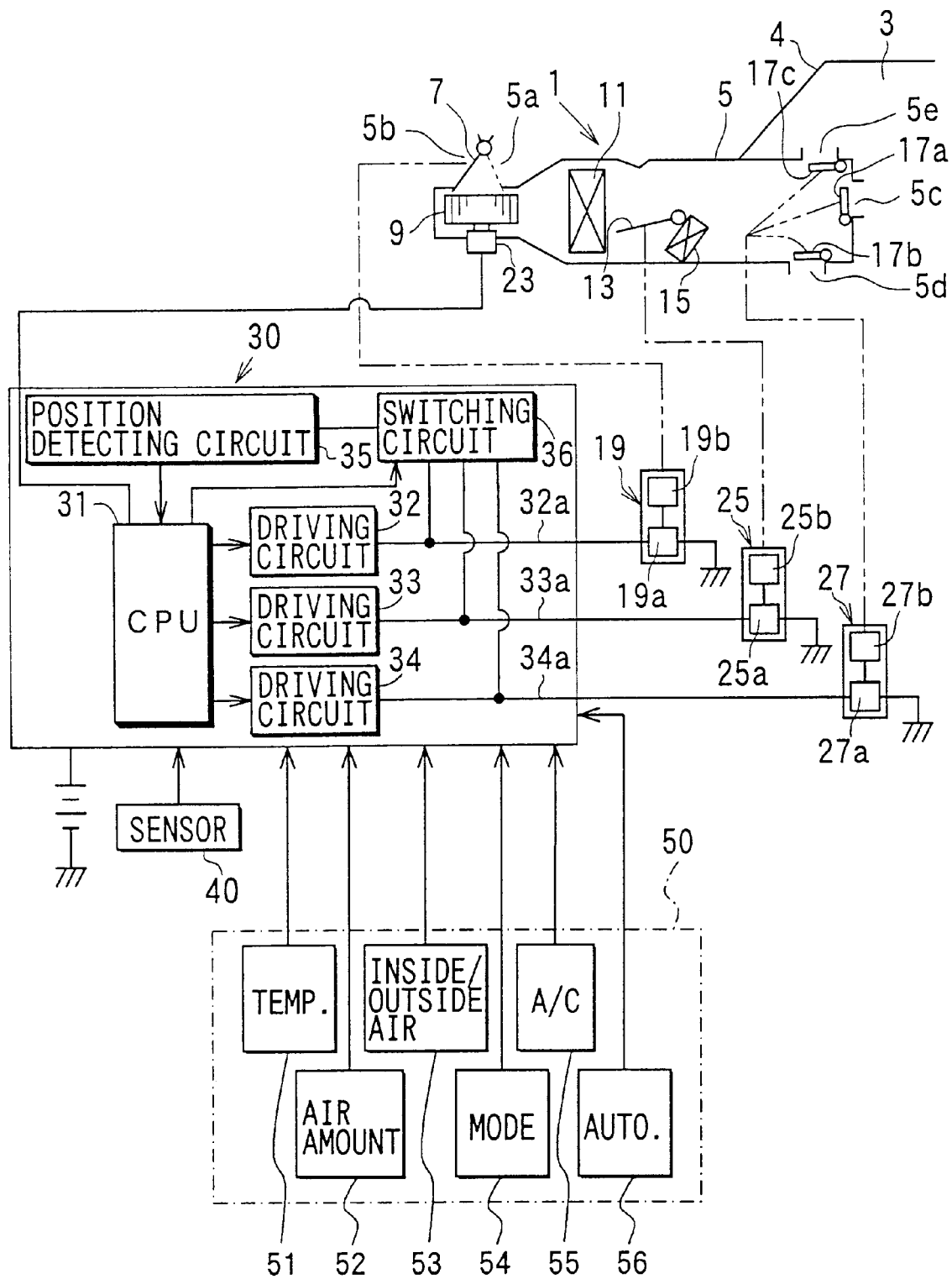
FIG. 1 is a schematic view showing an entire configuration of an automotive air conditioning system (first embodiment)

FIG. 1 is a schematic view showing a ventilation system and a control system of a first embodiment. As shown in FIG. 1, an air conditioner 1 for a vehicle includes an air conditioning unit in the front portion of a vehicle compartment 3, an air inlet door (driven member) 7, a blower 9, an evaporator (heat exchanger for cooling) 11, a temperature adjusting door (driven member and temperature adjusting member) 13, a heater core (heat exchanger for heating) 15, and first, second, and third air-blowing mode doors (driven members) 17a, 17b, and 17c. These components are disposed in order from the upstream side of air flow in an air conditioning casing 5 for forming an air path.

The air inlet door 7 is driven by a first servo motor (air inlet door driving means) 19. The first servo motor 19 has a DC electric motor 19a and a gear-type decelerating mechanism 19b for decelerating the rotation of the motor 19a. The output shaft of the decelerating mechanism 19b is connected to the air inlet door 7. The DC electric motor 19a is of a known type having a commutator and a brush.

By the driving of the first servo motor 19, the air inlet door 7 is switched between a first switch position (position indicated by the solid line in FIG. 1) to flow the outside air from an outside air inlet port 5a into the air conditioning casing 5 and a second switch position (position indicated by a broken line in the diagram) to flow the air in the vehicle compartment 3 (inside air) from an inside air inlet port 5b into the air conditioning casing 5.

The blower 9 blows either the outside air from the outside air inlet port 5a or the inside air from the inside air inlet port 5b as an air-flow to the evaporator 11 in accordance with the rotational speed of a blower motor 23. The evaporator 11 cools the air-flow from the blower 9 by a refrigerant circulated by operation of a refrigeration cycle of the air conditioner.

The temperature adjusting door 13 is driven by a second servo motor (temperature adjusting member driving means) 25 to flow the cooled air from the evaporator 11 into the heater core 15 and flow the remaining cooled air so as to bypass the heater core 15. The second servo motor 25 has a DC electric motor 25a of a type similar to the DC electric motor 19a and a gear-type decelerating mechanism 25b for decelerating the rotation of the motor 25a. The output shaft of the decelerating mechanism 25b is connected to the temperature adjusting door 13. The heater core 15 heats the air by using engine coolant as a heat source.

The first air-blowing mode door 17a opens/closes a face air-blowing outlet 5c, the second air-blowing mode door 17b opens/closes a foot air-blowing outlet 5d, and the third air-blowing mode door 17c opens/closes a defroster air-blowing outlet 5e. The first, second, and third air-blowing mode doors 17a, 17b, and 17c are driven by a common third servo motor 27 (mode door driving means). The third servo motor 27 has a DC electric motor 27a similar to the DC electric motor 19a and a gear-type decelerating mechanism 27b for decelerating the rotation of the motor 27a. The output shaft of the decelerating mechanism 27b is connected to the first, second, and third air-blowing mode doors 17a, 17b, and 17c.

By the opening/closing actions of the first, second, and third air-blowing mode doors 17a, 17b, and 17c, any of the following air-blowing modes is set; a face mode for blowing the air toward the upper part of a passenger in the vehicle compartment by fully opening the face air-blowing outlet 5c, a foot mode for blowing the air toward the feet of the passenger by fully opening the foot air-blowing outlet 5d, a defroster mode for blowing the air to the inner face of a wind shield glass 4 by fully opening the defroster air-blowing outlet 5e, a bi-level mode for blowing the air toward the upper part and the feet of the passenger by opening both the face air-blowing outlet 5c and the foot air-blowing outlet 5d, and a foot and defroster mode for blowing the air toward the feet of the passenger and the inner face of the wind shield glass 4 by opening both the foot air-blowing outlet 5d and the defroster air-blowing it outlet 5e.

An electronic control unit (ECU, control means) 30 for controlling operations of the first, second, and third servo motors 19, 25, and 27, the blower motor 23, and the like will be described.

The ECU 30 is to execute an air conditioning control based on detection signals from a sensor group 40 and a switch signal of an operation panel 50. The ECU 30 is constructed by a central processing unit (hereinbelow, called a CPU) 31, first through third driving circuits 32 through 34, a position detecting circuit 35, a switching circuit 36, not-illustrated ROM and RAM, and the like.

The CPU 31 executes a predetermined arithmetic operation in accordance with an execution command in a flowchart to be described hereinafter, and, on the basis of a result of the arithmetic operation, controls the blower motor 23, first through third driving circuits 32 through 34, and switching circuit 36.

The first driving circuit.32 supplies an electric current to the electric motor 19a in the first servo motor 19 under a control of the CPU 31. The second driving circuit 33 supplies the electric current to the electric motor 25a in the second servo motor 25 under the control of the CPU 31. The third driving circuit 34 supplies the electric current to the electric motor 27a in the third servo motor 27 under the control of the CPU 31.

The switching circuit 36 switches only one of three power supply lines 32a, 33a, and 34a for connecting the three driving circuits 32 through 34 and the three electric motors 19a, 25a, and 27a, respectively, to connect to the position detecting circuit 35 under control of the CPU 31.

The position detecting circuit 35 is switched to be connected to only one of the three power supply lines 32a, 33a, and 34a by the switching circuit 36. In an electric motor having a commutator and a brush, when the connecting relation between the commutator and the brush is switched in association with the rotation of the electric motor, a current value largely changes. The position detecting circuit 35 detects a current waveform of the connected power supply line, shapes the current to have a pulse waveform, and outputs the resultant to the CPU 31.

The CPU 31 receives the pulse waveform from the position detecting circuit 35 and counts the number of pulses. The CPU 31 detects the rotation position of each electric motor from the number of pulses and detects (estimates) the position of each of the doors from the detection result.

Therefore, the CPU 31, position detecting circuit 35, and switching circuit 36 construct position detecting means for detecting the rotation position of each electric motor.

To the ECU 30, detection signals of inside air temperature, outside air temperature, solar radiation amount, engine coolant temperature, temperature of air blown from the evaporator 11 as the cooling degree of the evaporator 11, and the like are input.

Further, the operation panel 50 installed within an instrument panel includes the following switches manually operated by the passenger. Operation signals of the operation switches are also input to the ECU 30.

The switches of the operation panel 50 include a temperature setting switch 51 for setting the temperature in the vehicle compartment as a control target, an air flow amount switch 52 for generating an air flow amount switching signal of the blower 9, an inside air/outside air switch 53 for generating an inside air/outside air switch signal, an air-blowing mode switch 54 for generating an air-blowing mode signal, an air-conditioner switch 55 for generating an ON/OFF signal of an electromagnetic clutch for a compressor, and an automatic switch 56 for setting an air-condition automatic control mode.

Figure 2:
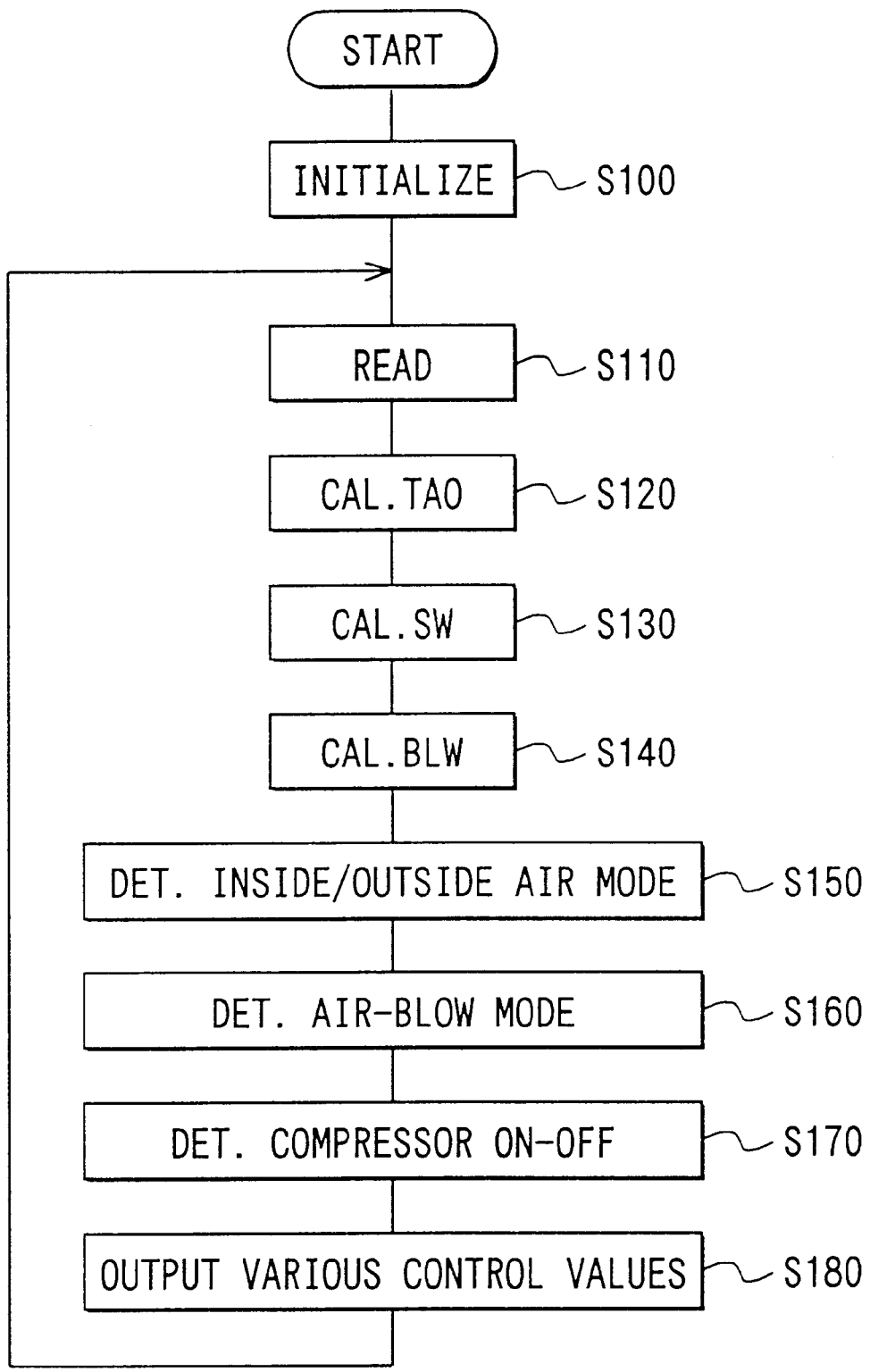
FIG. 2 is a flowchart showing operations (first embodiment)

The operation of the present embodiment will be explained. The flowchart in FIG. 2 shows the outline of a control process executed by the ECU 30. The control routine of FIG. 2 is started when an ignition switch of a vehicle engine is turned on to supply electric power to the ECU 30.

First, in step S100, flags, timer, and the like are initialized. In step S110, the detection signals from the sensor group 40, operations signals from the switches 51 through 56 of the operation panel 50, and the like are read.

In step S120, a target blown air temperature TAO of the air-conditioned air blown off into the vehicle compartment 3 is calculated on the basis of set temperature, inside air temperature, outside air temperature, and solar radiation amount. The target blown air temperature TAO is the temperature of blown air for maintaining the inside of the vehicle compartment 3 at the set temperature of the temperature setting switch 51.

In step S130, a target opening degree SW of the temperature adjusting door 13 is calculated on the basis of the target blown air temperature TAO, engine coolant temperature, and temperature of air blown from the evaporator. The target opening angle SW is an opening degree of the temperature adjusting door 13 for adjusting the temperature of the air-conditioned air blown off into the vehicle compartment 3 to the target blown air temperature TAO.

In step S140, a target air flow amount BLW of air blown by the blower 9 is calculated on the basis of the TAO. The target air flow amount BLW is calculated by using a map. The target air flow amount is set to be high on the high temperature side (maximum heating side) and the low temperature side (maximum cooling side) of the TAO and is set to be low in an intermediate temperature range of the TAO.

The inside air/outside air mode is determined in accordance with the TAO in step S150. The inside air/outside air mode is switched from a full, inside air mode, through an inside air and outside air mixed mode, to a full outside air mode, or from the full inside air mode to the full outside air mode as the TAO increases from the low temperature to the high temperature.

In step S160, the air-blow mode is determined in accordance with the TAO. The air-blow mode is switched from the face mode, through the bi-level mode, to the foot mood as the TAO increases from the low temperature to the high temperature.

In step S170, the intermission of the compressor operation is determined. The intermission of the compressor operation is determined by comparing the target temperature of the air blown by the evaporator with an actual temperature of the air blown by the evaporator. Specifically, when the temperature of the air blown by the evaporator becomes below the target temperature of the air blown by the evaporator, the compressor is stopped. On the contrary, when the temperature of the air blown by the evaporator becomes higher than the target temperature of the air blown by the evaporator, the compressor is operated.

In step S180, on the basis of various control values calculated in steps S130 through S170, or manually operated signals when the switches 51 through 56 of the operation panel 50 are operated, the operations of the doors 7, 13, 17a, 17b, and 17c, blower 9, and the compressor are controlled.

Next, a process of step S180 will now be described in more detail with reference to FIGS. 3–5.

Figure 3:
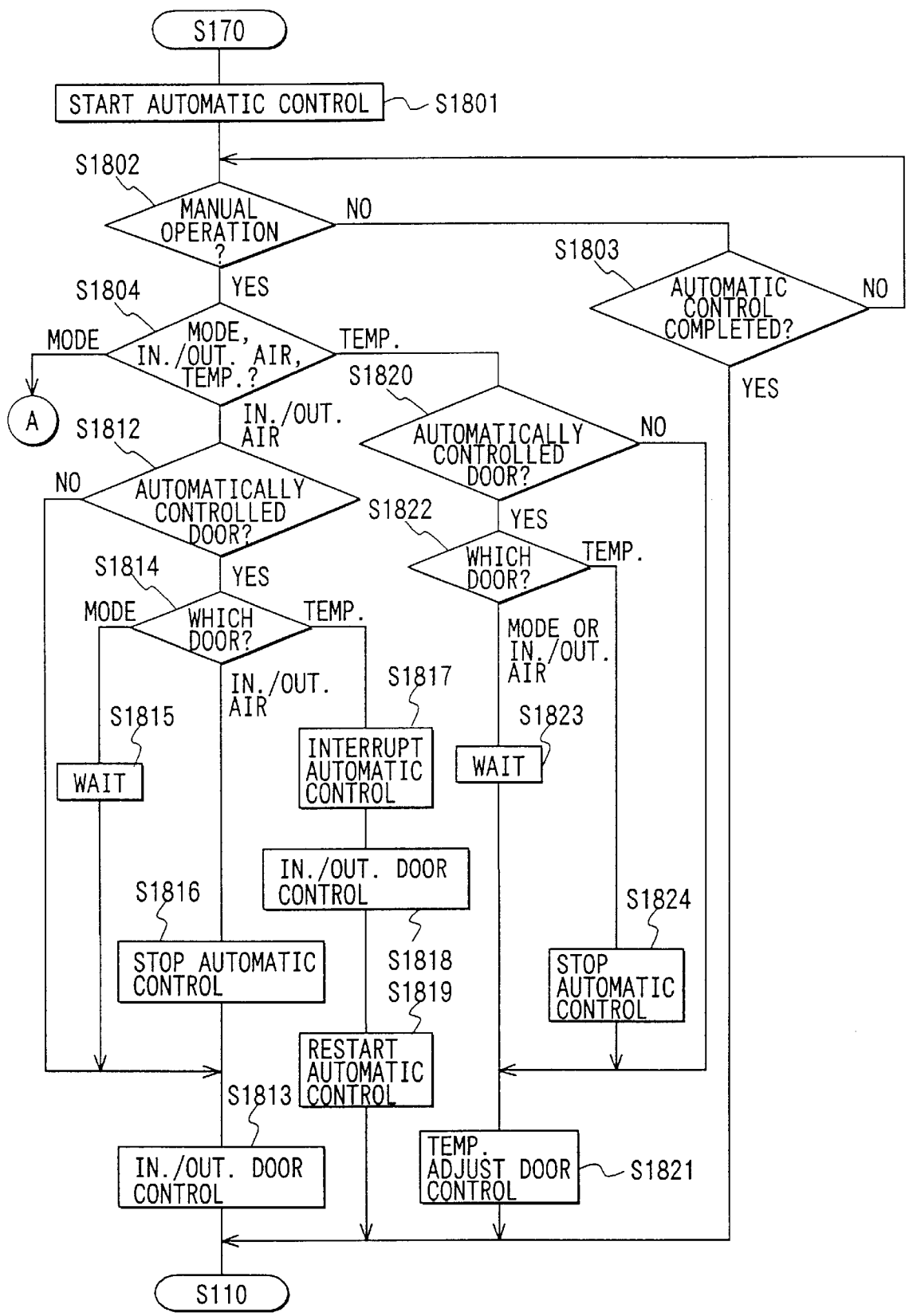
FIG. 3 is a flowchart showing a part of the details of a process in step S180 in FIG. 2 (first embodiment)

First, in FIG. 3, in step S1801, based on various control values calculated in steps S130 through S170, automatic control on the doors 7, 13, 17a, 17b, and 17c, blower 9, and compressor is started.

When any of the temperature setting switch 51, inside air/outside air switch 53, and air-blowing mode switch 54 is not operated (NO in step S1802), until the automatic control is completed (YES in step S1803), the automatic control is continued.

In the automatic control, the operation position of the air inlet door 7 is controlled by the driving of the first servo motor 19 so that the inside/outside air mode determined in step S150 is obtained. The operation positions of the air-blowing mode doors 17a, 17b, and 17c are controlled by the driving of the third servo motor 27 so that the air-blowing mode determined in step S160 is obtained.

The opening degree of the temperature adjusting door 13 is controlled by the driving of the second servo motor 25 so as to be coincided with the target opening degree SW calculated in step S130. The application voltage is controlled to control the rotational speed of the blower motor 23 so as to obtain the target air blow rate BLW calculated in step S14G. The operation of the compressor is ON/OFF controlled so that the actual temperature of the air blown by the evaporator coincides with the target temperature of the air blown by the evaporator.

The three servo motors 19, 25, and 27 are sequentially operated one by one. When the first servo motor 19 operates, the position detecting circuit 35 is connected to the power supply line 32a of the first servo motor 19 by the switching circuit 36. The current waveform of the power supply line 32a is shaped into a pulse waveform, and output into the CPU 31. The CPU 31 detects the rotation amount of the electric motor 19a in the first servo motor 19 and, further, the position of the air inlet door 7 from the number of pulses.

When the second servo motor 25 operates, the position detecting circuit 35 is switched to the power supply line 33a in the second servo motor 25 by the switching circuit 36. The current waveform of the power supply line 33a is shaped into a pulse waveform, and output into the CPU 31. The CPU 31 detects the rotation amount of the electric motor 25a in the second servo motor 25 and, further, the position (opening angle) of the temperature adjusting door 13 driven by the second servo motor 25 from the number of pulses.

Further, when the third servo motor 27 operates, the position detecting circuit 35 is switched to the power supply line 34a in the third servo motor 27 by the switching circuit 36. The current waveform of the power supply line 34a is shaped into a pulse waveform, and output into the CPU 31. The CPU 31 detects the rotation amount of the electric motor 27a in the third servo motor 27 and, further, the positions of the air-blowing mode doors 17a, 17b, and 17c driven by the third servo motor 27 from the number of pulses.

Next, a control performed in the case where any of the temperature setting switch 51, air inlet switch 53, and air-blowing mode switch 54 is operated during automatic control (YES in step S1802) will be explained.

First, when any of the switches 51, 53, and 54 is operated, the program advances to step S1804 and determines the switch operated. When the air-blowing mode switch 54 is operated, the mode is switched to the air-blowing mode selected by manual operation in steps S1805 through S1811 shown in FIG. 4.

Figure 4:
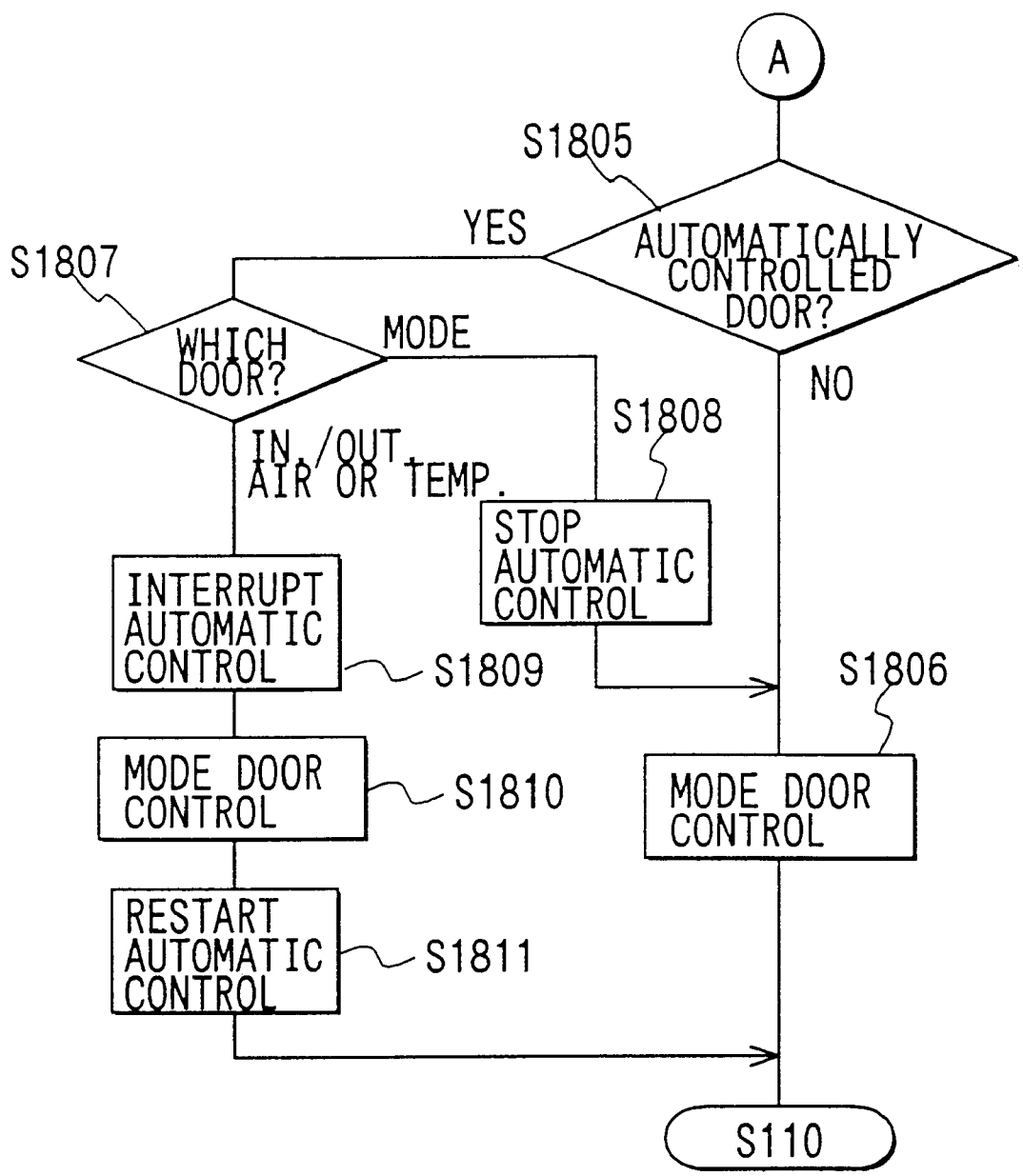
FIG. 4 is a flowchart showing the rest of the details of the process in step S180 in FIG. 2 (first embodiment)

In FIG. 4, first, whether there is a door being automatically controlled is determined in step S1805. When there is no door being automatically controlled, the program advances to step S1806 where a control of switching the mode to the air-blowing mode selected by the manual operation is executed.

Figure 5:
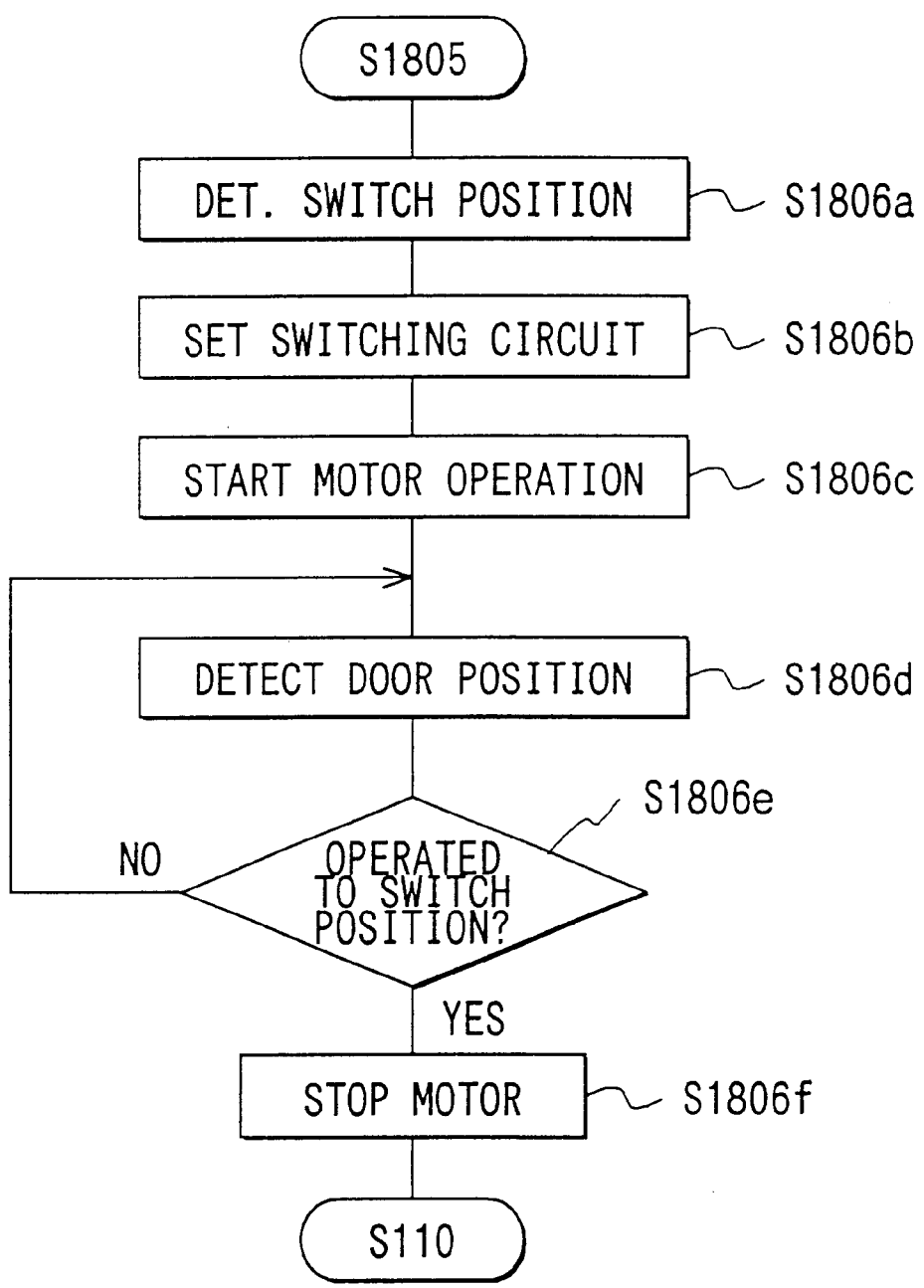
FIG. 5 is a flowchart showing the details of a process in step S1806 in FIG. 4 (first embodiment)

FIG. 5 shows the detailed process of step S1806. On the basis of a signal of the air-blowing mode switch-54, the switch position of each of the air-blowing mode doors 17a, 17b, and 17c is determined (step S1806a). The position detecting circuit 35 is connected to the power supply line 34a of the third servo motor 27 by the switching circuit 36

(step S1806b). Supply of electric current to the electric motor 27a in the third servo motor 27 is started by the third driving circuit 34 (step S1806c). Subsequently, in step S1806d, on the basis of the pulse waveform from the position detecting circuit 35, the rotation amount of the electric motor 27a and, moreover, the positions of the air-blowing mode doors 17a, 17b, and 17c are detected.

In step S1806e, on the basis of a result of the door position detection in step S1806d, whether the air-blowing mode doors 17a, 17b, and 17c are operated to the switch positions determined in step S1806a or not are determined. When the air-blowing mode doors 17a, 17b, and 17c are operated to the switch positions (completion of the operation) (YES in step S1806e), the program advances to step S1806f where the supply of the electric current to the electric motor 27a is stopped.

Meanwhile, when YES in step S1805 in FIG. 4, that is, when there is a door being automatically controlled, which door is being automatically controlled is determined in step S1807. When the air-blowing mode doors 17a, 17b, and 17c are under automatic control, the automatic control on the air-blowing mode doors 17a, 17b, and 17c is stopped in step S1808, and a control of switching the mode to the air-blowing mode selected by manual operation is executed in step S1806.

When the air inlet door 7 or temperature adjusting door 13 is being automatically controlled (NO in step S1807), the automatic control on the doors 7 and 13 is interrupted in step S1809. The control of switching the mode to the air-blowing mode selected by manual operation is executed in step S1810. After that, the automatic control on the doors 7 and 13, which has been once interrupted in step S1809 is re-started in step S1811. The process of step S1810 is the same as that of step S1806.

Next, a control performed in the case where the air inlet switch 53 is operated during automatic control (YES in step S1802) will be explained with reference to FIG. 3. In this case, the mode is switched to the inside air/outside air mode selected by manual operation in steps S1812 through S1819.

In FIG. 3, whether there is a door being automatically controlled is determined in step S1812. When there is no door automatically controlled, the program advances to step S1813 where the control of switching the mode to the inside air/outside air mode selected by manual operation is executed.

The detailed procedure of step S1813 is substantially the same as that of step S1806 described above except that the controlled door is different. That is, the switch position of the air inlet door 7 is determined on the basis of the signal of the air inlet switch 53, the position detecting circuit 35 is connected to the power supply line 32a of the first servo motor 19 by the switching circuit 36, and the supply of an electric current to the electric motor 19a in the first servo motor 19 is started by the first driving circuit 32. Then, on the basis of the pulse waveform from the position detecting circuit 35, the rotational amount of the electric motor 19a and, further, the position of the air inlet door 7 are detected. When it is determined that the air inlet door 7 is operated to a predetermined switch position (completion of operation), the supply of the electric current to the electric motor 19a is stopped.

When YES in step S1812, that is, when there is a door being automatically controlled, which door is being automatically controlled is determined in step S1814. When the air-blowing mode doors 17a, 17b, and 17c are being automatically controlled, the program waits in step S1815 until the automatic control of the air-blowing mode doors 17a, 17b, and 17c is finished. After that, a control of switching the mode to the inside air/outside air mode selected by manual operation is executed in step S1813.

When the air inlet door 7 is being automatically controlled, the program advances from step S1814 to step S1816 where the automatic control on the air inlet door 7 is stopped. In step S1813, the control of switching the mode to the inside air/outside air mode selected by manual operation is executed.

In the case where temperature adjusting door 13 is being automatically controlled, the program advances from S1814 to step S1817 where the automatic control on the temperature adjusting door 13 is interrupted. A control of switching the mode to the inside air/outside air mode selected by manual operation is executed in step S1818. After that, the automatic control on the temperature adjusting door 13 once interrupted in step S1817 is restarted in step S1819. The process of step S1818 is the same as that in step S1813.

Next, a control performed in case where the temperature setting switch 51 is operated during the automatic control (YES in step S1802) will be explained. In this case, the opening angle of the temperature adjusting door 13 is adjusted so that the temperature in the vehicle compartment 3 becomes a temperature set by manual operation in steps S1820 through S1824.

First, in step S1820, whether there is a door being automatically controlled is determined. When there is no door being automatically controlled, the program advances to step S1821 where a control based on the temperature set by manual operation is executed.

Here, the detailed procedure in step S1821 is substantially the same as that in step S1806 except that the temperature adjusting door 13 is controlled. Specifically, the opening degree of the temperature adjusting door 13 is determined based on a signal of the temperature setting switch 51 and the like, the position detecting circuit 35 is connected to the power supply line 33a of the second servo motor 25 by the switching circuit 36, and the supply of an electric current to the electric motor 25a in the second servo motor 25 is started by the second driving circuit 33. Subsequently, on the basis of the pulse waveform from the position detecting circuit 35, the rotational amount of the electric motor 25a and, further, the opening degree of the temperature adjusting door 13 are detected. When it is determined that the temperature adjusting door 13 is operated to a predetermined opening degree (completion of operation), the supply of the electric current to the electric motor 25a is stopped.

On the other hand, when YES in step S1820, that is, when there is a door being automatically controlled, which door is being automatically controlled is determined in step S1822. When any of the air-blowing mode doors 17a, 17b, and 17c and the air inlet door 7 is automatically controlled, the program waits in step S1823 until the automatic control on the doors 17a, 17b, 17c, and 7 is finished. After that, a control based on the temperature set by manual operation is executed in step S1821.

When the temperature adjusting door 13 is being automatically controlled, the program advances from step S1822 to step S1824 where the automatic control on the temperature adjusting door 13 is stopped, and a control based on the temperature set by manual operation is executed in step S1821.

As described above, in the embodiment, change of the electric current amount associated with the rotation of the electric motor is detected, thereby detecting the position of each door. Thus, there is no need to prepare a potentiometer.

Moreover, by sequentially operating the three electric motors 19a, 25a, and 27a one by one and switching the connection between the position detecting circuit 35 and the three power supply lines 32a, 33a, and 34a by the switching circuit 36, the electric current change in: the three electric motors 19a, 25a, and 27a can be detected by the single position detecting circuit 35.

In the case where there is a request of switching between the inside air and the outside air to prevent the flow of a smell or the like into the vehicle compartment, desirably, the switching between the inside air and the outside air is preferentially performed so that the passenger does not feel unpleasant due to response delay.

When the air-blowing mode is switched, the passenger is sensitive to the switching (can recognize it quickly). On the contrary, the passenger is relatively insensitive to a change of the blown air temperature. Thus, when a request of switching the air-blowing mode is made by manual operation of the passenger, for example, during adjustment of the blown air temperature, in order to prevent the passenger from feeling unpleasant due to response delay, it is desirable to switch the air-blowing mode preferentially.

In the present embodiment, when there is a request of switching the inside air/outside air mode and the air-blowing mode by manual operation during the automatic control of the temperature adjusting door 13, the priority is placed on the switch between the inside air/outside air mode and the air-blowing mode over the temperature adjustment. Thus, it prevents the passenger from feeling unpleasant due to response delay.

(Second Embodiment)

Figure 6:
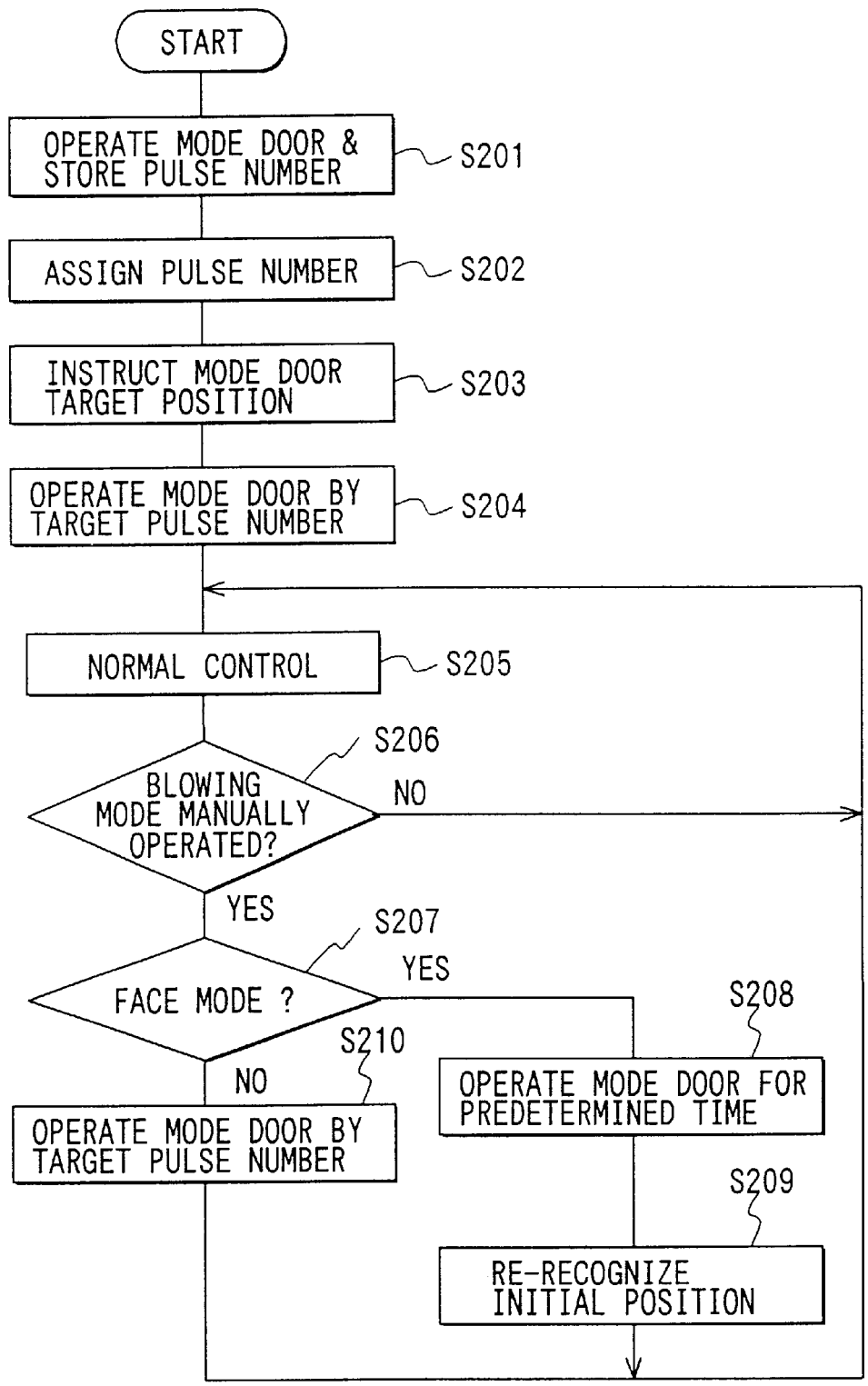
FIG. 6 is a flowchart showing operations (second embodiment).

FIG. 6 shows the main program of a control process of an air conditioner according to a second embodiment. The second embodiment is realized by adding a control process of recognizing a rotation stop position (the origin position) of the electric motor 27a when each of the first, second, and third air-blowing mode doors 17a, 17b, and 17c is positioned at an end to the first embodiment.

When the first, second, an d third air-blowing mode doors 17a, 17b, and 17c operate in association with rotation in a predetermined direction of the electric motor 27a in the third servo motor 27, the air-blowing mode is switched in accordance with the order of the face mode, bi-level mode, foot mode, foot and defroster mode, and defroster mode. Therefore, in the face mode and the defroster mode, each of the first, second, and third mode doors 17a, 17b, and 17c is positioned at an end.

Next, a control process of the second embodiment will be explained with reference to FIG. 6. The control routine of FIG. 6 is started when the ignition switch of the vehicle engine is turned on to supply an electric power to the ECU 30.

First, in step S201, each of the first, second, and third air-blowing mode doors 17a, 17b, and 17c is operated toward a position of one of ends (face mode position) for predetermined time (time corresponding to the one side of a full stroke or longer). The rotation stopped position of the electric motor 27a after operation for the predetermined time is stored as the initial position into the ECU 30. In step S201, each of the first, second, and third air-blowing mode doors 17a, 17b, and 17c is operated for predetermined time from the position of one of the ends toward the position of the other end (defroster mode position). The number of pulses between the positions of both ends is counted on the basis of the pulse waveform from the position detecting circuit 35 and is stored in the ECU 30.

In step S202, the number of pulses of operation is assigned to each of stop positions (bi-level mode position, foot mode position, foot and defroster mode position, and defroster mode position) within the operation range preset in the ECU 30, and is stored in the ECU 30.

After that, in step S203, the operation target positions of the first, second, and third air-blowing mode doors 17a, 17b, and 17c are instructed. Further, in step S204, the third servo motor 27 is driven only by the number of pulses corresponding to the operation target position and is stopped. By the above-described control process, the initial setting is completed. The program advances to step S205 where a normal control is executed. In step S205, a control process similar to that in step S110 through step S180 in FIG. 2 is performed.

When the air-blowing mode switch 54 is operated during execution of normal control (YES in step S206), the program advances to step S207. When the selected air-blowing mode is the face mode (YES in step S207), the program advances to step S208.

In step S208, each of the first, second, and third air-blowing mode doors 17a, 17b, and 17c is operated toward the face mode position for a predetermined time (corresponding to the one side of a full stroke or longer). In step S209, the rotation stopped position of the electric motor 27a after operation for the predetermined time is stored as new initial position into the ECU 30 (the initial position is re-recognized).

On the other hand, when the selected air-blowing mode is any mode other than the face mode (NO in step S207), the program advances to step S210. In step S210, the third servo motor 27 is driven only by the number of pulses to the selected air-blowing mode position and stopped.

In the present embodiment, even in the case where a positional deviation occurs in the first, second, and third air-blowing mode doors 17a, 17b, and 17c due to vibrations or the like while the vehicle is driving after storing the initial position of the electric motor 27a for driving the first, second, and third air-blowing mode doors 17a, 17b, and 17c in step S201, since the initial position of the electric motor 27a is re-recognized in step S209, an influence of the positional deviation is eliminated.

(Modifications)

In the above-described embodiments, the driving apparatus of the present invention is applied to an air conditioner for a vehicle. Alternatively, the driving apparatus may be also applied for other apparatus.

In each of the above-described embodiments, when any of the temperature setting switch 51, inside air/outside air switch 53, and air-blowing mode switch 54 is operated during any of the doors is driven based on a detection signal from the sensor group 40, the control (driving of the door) based on the manual operation may be preferentially executed.

In the above-described embodiments, an electric motor having a commutator and a brush is used as each of the electric motors 19a, 25a, and 27a. Alternatively, a stepping motor, which rotates only by one step each time one electric pulse is applied and stops in the position with a predetermined holding torque, may be also used.

In the case of using the stepping motor, the number of electric pulses applied to the stepping motor is determined by arithmetic operation in the CPU31, and the rotational position of the stepping motor is detected from the information of the number of electric pulses determined by the CPU 31. In the case of using the stepping motor, therefore, the CPU 31 serves as position detecting means.

In the case where the inside air/outside air switch 53 and the air-blowing mode switch 54 are almost simultaneously operated in the first embodiment, priority may be placed on the switch of the inside air/outside air mode over the switch of the air-blowing mode or, on the contrary, the priority may be placed on the switch of the air-blowing mode over the switch of the inside air/outside air mode.

Even in the case where the priority is placed on the switch of the inside air/outside air mode over the switch of the air-blowing mode when the inside air/outside air switch 53 and the air-blowing mode switch 54 are almost simultaneously operated, when the defroster mode is selected as the air-blowing mode, from a viewpoint of safety in driving, it is desirable to place the priority on the switch to the defroster mode over the switch of the inside air/outside air mode.

The present invention may be also applied to an air conditioner for a vehicle of a right and left sides independent control type having two temperature adjusting doors 13 and two servo motors 25 and independently controlling the temperature of blown air on the driver's seat side and that on the passenger seat side.

In this case, it is desirable to preferentially control the temperature on the driver's seat side. That is, it is desirable to operate the temperature adjusting door for the driver's seat for adjusting the temperature of blown air on the driver's seat side to the target opening degree and, after that, operate the temperature adjusting door for the passenger seat for adjusting the temperature of blown air on the passenger seat side to the target opening degree.

In the right and left sides independent control type air conditioner for a vehicle, it is also possible to divide the operation amount to the target opening degree of each of the temperature adjusting door for the driver's seat and the temperature adjusting door for the passenger seat into a plurality of operation amounts and alternately operate the temperature adjusting doors for the driver's seat and the passenger seat every divided operation amount.

Further, in the right and left sides independent control type air conditioner for a vehicle, it is also possible to provide two position detecting circuits 35 and two switching circuits 36, to detect the rotation position of the electric motor for driving one of temperature adjusting doors (for example, for the driver's seat) and the rotation position of the electric motor for driving the air inlet door by one set of the position detecting circuit and the switching circuit, and to detect the rotation position of the electric motor for driving the other temperature adjusting door (for example, for the passenger seat) and the rotation position of the electric motor for driving the air-blowing mode door by the other set of the position detecting circuit and switching circuit. In this case, it is desirable to preferentially operate the air inlet door over one of the temperature adjusting doors and preferentially operate the air-blowing mode door over the other temperature adjusting door.

Further, the present invention may be applied to an air conditioner for a vehicle of an upper/lower sides independent control type having two temperature adjusting doors 13 and two servo motors 25, in which the temperature of air blown from the face air-blowing port 5*c* and the temperature of air blown from the foot air-blowing port 5*d* are independently controlled. In this case, since the face is more sensitive to the temperature than the feet, it is desirable to place the priority on the temperature control on the face air-blowing port 5*c* side over the temperature control on the foot air-blowing port 5*d* side.

Further, the present invention may be applied to an air conditioner for a vehicle of a front/rear sides independent control type having two temperature adjusting doors 13 and two servo motors 25, in which the temperature of the air blown on the front seat side and the temperature of air blown on the rear seat side are independently controlled. In this case, it is desirable to place the priority on the temperature control the front seat side over the temperature control on the rear seat side.

In the first embodiment, the flow amount of the air flowing in the heater core 15 and that of air bypassing the heater core are adjusted by the temperature adjusting door 13 to thereby control the temperature of blown air. The present invention may be also applied to an air conditioner for a vehicle of a type of adjusting the volume of engine coolant flowing in the heater core 15 by a flow amount adjusting valve (driven member, temperature adjusting member), thereby controlling the temperature of the blown air. In this case, in place of the temperature adjusting door 13, the flow amount adjusting valve is driven by the second servo motor 25.

In the first embodiment, three servo motors as driving means are provided. Alternatively, the present invention may be also applied to a case where two servo motors or four or more servo motors are provided. For example, in the case where five servo motors are provided, two position detecting circuits 35 and two switching circuits 36 are provided. An electric current change in two servo motors is detected by one set of the position detecting circuit and the switching circuit, and an electric current change in the remaining three servo motors is detected by the other set of the position detecting circuit and the switching circuit.

In the second embodiment, the rotation stop position of the electric motor 27*a* in a state where each of the first, second, and third air-blowing mode doors 17*a*, 17*b*, and 17*c* is in the face mode position is set as the initial position. Alternatively, the rotation stop position of the electric motor 27*a* in a state where each of the first, second, and third air-blowing mode doors 17*a*, 17*b*, and 17*c* is in the defroster mode position may be used as the initial position, or the rotation stop position of the electric motor 27*a* in the positions of the face mode and the defroster mode may be set as the initial position.

In the second embodiment, the initial position is re-recognized when the face mode is selected by the operation of the air-blowing mode switch 54. Alternatively, the initial position may be also re-recognized when the face mode is selected based on the TAO.

In the second embodiment, only the electric motor 27*a* for driving the first, second, and third air-blowing mode doors 17*a*, 17*b*, and 17*c* has been explained. With respect to each of the electric motors 19*a* and 25*a* for driving the temperature adjusting door 13 and the air inlet door 7, respectively, the initial position may be recognized by a method similar to the above.

What is claimed is:

1. A driving apparatus comprising:

electric motors;

a plurality of driven members driven by said electric motors;

a control means for controlling operation of said electric motors; and a position detecting means for detecting a rotation position of each of said electric motors, wherein when a request of simultaneously operating the plurality of driven members is made, said control means controls said electric motors so as to sequentially operate said driven members one by one.

2. A driving apparatus according to claim 1, wherein when a request of simultaneously operating the plurality of driven members is made, said control means controls said electric motors so as to operate said driven members in accordance with a predetermined priority order.

3. A driving apparatus according to claim 1, wherein when said control means starts to control, said control means stores a rotation stop position of each of said electric motors when each of said driven members is driven to an end of an operation range by said electric motor as an initial position, and when a request of operating each of the driven members to the end of the operation range is made after storing the initial position, said driven member is driven by said electric motor toward the end of the operation range for a predetermined time, and a rotation stop position of: said electric motor after the driving for the predetermined time is stored as a new initial position into said control means.

4. A driving apparatus according to claim 1, wherein said position detecting means detects a rotation amount of said electric motor based on an electric current change associated with rotation of said electric motor.

5. A driving apparatus for an electric motor, comprising:

a plurality of electric motors;

a plurality of electric power supply lines provided for said electric motors respectively, for supplying electric power to said electric motors;

a position detecting means for detecting a rotation position of each of said electric motors based on an electric current waveform generated in said electric power supply line;

a control means for selecting and controlling one of the plurality of electric motors when a request of simultaneously operating the plurality of electric motors is made; and an electric power supply line switching means for connecting the electric power supply line for said one of the plurality of electric motors to said position detecting means.

6. A driving apparatus for an electric motor according to claim 5, wherein each of said electric motors includes a commutator and a brush.

* * * * *